Dec. 9, 1958     L. C. MONTGOMERY     2,863,329
GAS FEED FOR MOTOR VEHICLES
Original Filed Nov. 25, 1952
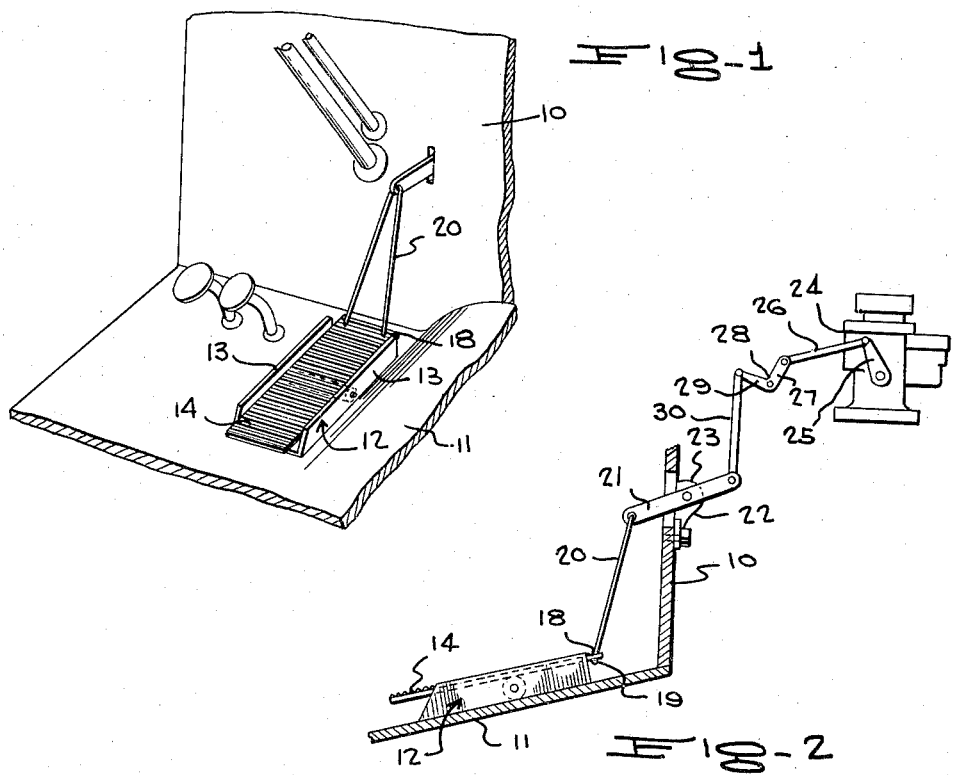
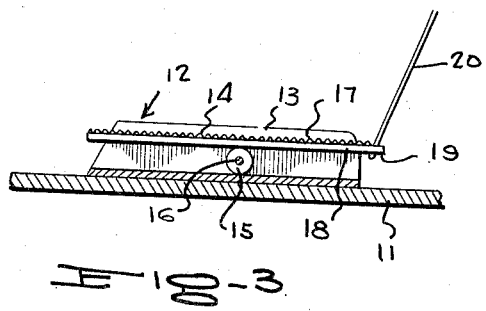
INVENTOR.
LAWRENCE C. MONTGOMERY
BY
*Christian R. Nielsen*
ATTORNEY — # United States Patent Office 2,863,329
Patented Dec. 9, 1958

2,863,329
GAS FEED FOR MOTOR VEHICLES

Lawrence C. Montgomery, Seneca, Mo.

Substituted for abandoned application Serial No. 322,448, November 25, 1952. This application November 13, 1957, Serial No. 696,075

1 Claim. (Cl. 74—513)

This invention relates to accelerator pedals for controlling the gas feed to the engine of a motor vehicle, and it consists in the constructions, arrangements and combinations herein described and claimed.

This application is a substitute for forfeited application filed November 25, 1952, Serial Number 322,448.

In the present day construction of accelerator pedals for controlling the feed of gas to the engine of a motor vehicle, the pedal remains in a fixed position with respect to the floor board of the vehicle, which requires that the operator of the vehicle maintain his foot in a certain position and over long periods of time, especially on long trips, the leg and foot of the operator become tired and cramped.

It is therefore the main object of the invention to provide an accelerator pedal which may be rocked or moved rearwardly in controlling the acceleration of the engine, thus permitting relaxation of the foot and leg of the operator, due to the variable positioning of the foot and leg.

It is also an object of the invention to provide an accelerator pedal of simple construction and which may be readily installed upon motor vehicles now in operation with a minimum of effort.

Additional objects, advantages and features of invention will be apparent from the following description, considered in conjunction with the accompanying drawing, wherein Figure 1 is a fragmentary perspective view of a motor vehicle dash and floor board having my accelerator installed.

Figure 2 is a vertical section therethrough, illustrating the connection thereof with a carburetor, and Figure 3 is a longitudinal sectional view of the accelerator pedal and mounting means therefor.

There is illustrated a portion of motor vehicle dash 10 and floor board 11 of conventional construction.

Upon the floor board 11, a guide channel 12 is secured which includes parallel side walls 13 of a width to slidably and rockably receive a foot treadle 14 which is a rigid construction.

A roller 15 is disposed transversely between the walls 13, journalled upon a shaft 16, the shaft being secured between the walls 13.

The upper surface of the treadle 14 is preferably corrugated as indicated at 17, so as to prevent slippage of the foot of an operator.

The forward end of the treadle 14 is provided with a bearing 19 for mounting one end of a yoke 20. The yoke 20 extends upwardly at approximately 45 degrees and is secured to one end of a lever 21. The lever 21 projects through a slot in the dash board 10 and intermediate the length thereof, is pivotally mounted between ears 22 of a bracket 23, secured to the rear of the dash.

A carburetor 24 is mounted upon the engine as is customary and includes a throttle lever 25 for actuating the throttle valve. A lever 26 has one end connected to the lever 25, the other end being connected to an arm 27 of a bell crank 28. The other arm 29 of the bell crank is connected to the adjacent end of the lever 21 by a link 30.

It will be understood, of course, that the connecting links and levers between the throttle lever 25 and the link 12 will vary in different makes of cars.

In operation, it will be seen that a downward rocking pressure upon the forward portion of the treadle 14, will draw downwardly upon the yoke 20, with consequent opening of the throttle of the carburetor, through oscillation of the throttle lever 25. However, by exerting a rearward heel pressure on the treadle 14, the yoke 20 will also effect a downward pull upon the lever 21, with consequent control of the throttle of the carburetor. Thus, it will be seen that the carburetor throttle may be controlled through imparting a rocking movement of the treadle, the roller 15 acting as a fulcrum, or the treadle may be moved rearwardly by exerting a rearward heel pressure, the roller in this instance, functioning to provide smooth sliding action of the treadle between the side walls of the guide channel.

While I have shown and described a preferred form of the invention, this is by way of illustration only, and I consider as my own all such modifications in construction as fairly fall within the scope of the appended claim.

I claim:

In a fuel accelerator pedal for motor vehicles, a lever rockably mounted in the dash of a motor vehicle, one end having a lever and link connections associated with the throttle lever of a carburetor, a guide channel mounted on the floor board of the vehicle, a roller rotatably mounted transversely of said channel and positioned intermediate the length thereof, a foot treadle disposed within the guide channel in contacting engagement with said roller, said treadle being rockable on said roller upon application of pressure at the forward end thereof, and rearwardly slidable upon application of rearward pressure on said treadle and a yoke member connected between the forward end of said treadle and the other end of the first named lever.

References Cited in the file of this patent

UNITED STATES PATENTS

| | | |
|---|---|---|
| 1,344,466 | Whitney | June 22, 1920 |
| 1,944,699 | Gehbauer | Mar. 19, 1935 |
| 2,207,435 | Jones | July 9, 1940 |
| 2,619,846 | Wales et al. | Dec. 2, 1952 |